(12) United States Patent
Georges et al.

(10) Patent No.: US 6,241,393 B1
(45) Date of Patent: Jun. 5, 2001

(54) GREASE-LUBRICATED SLIDING GUIDING MEMBERS HAVING A LOW COEFFICIENT OF FRICTION AND AN IMPROVED LIFETIME

(75) Inventors: Etienne Georges, Saint-Etienne; Daniel Tourneux, Firminy, both of (FR)

(73) Assignee: Centre Stenhanois de Recherches Mecaniques Hydromechanique et Frottement, Andrezieux-Boutheon (FR)

( * ) Notice: Subject to any disclaimer, the term of this patent is extended or adjusted under 35 U.S.C. 154(b) by 0 days.

(21) Appl. No.: 09/395,853

(22) Filed: Sep. 14, 1999

(30) Foreign Application Priority Data

Sep. 16, 1998 (FR) .................................................. 98 11555

(51) Int. Cl.[7] ..................................................... F16C 33/74
(52) U.S. Cl. ........................ 384/130; 384/132; 384/322; 384/462; 384/477; 384/478
(58) Field of Search .................................... 384/130, 132, 384/322, 462, 477, 478

(56) References Cited

U.S. PATENT DOCUMENTS

| | | |
|---|---|---|
| 4,573,807 | 3/1986 | Asada et al. . |
| 5,462,362 | 10/1995 | Yuhta et al. . |
| 5,468,071 | 11/1995 | Tourneux et al. . |
| 5,516,212 * | 5/1996 | Titcomb ................................ 384/107 |
| 5,518,605 | 5/1996 | Hadj-Rabah et al. . |

FOREIGN PATENT DOCUMENTS

| | | |
|---|---|---|
| 2 323 895 | 5/1973 | (DE) . |
| 3 241 002 | 11/1982 | (DE) . |
| 0 168 663 | 6/1985 | (EP) . |
| 0 435 482 | 12/1990 | (EP) . |
| 910 999 | 10/1962 | (FR) . |
| 2 693 520 | 7/1992 | (FR) . |
| 2 708 623 | 8/1993 | (FR) . |
| 1 518 332 | 5/1975 | (GB) . |

* cited by examiner

*Primary Examiner*—Lenard A. Fooftland
(74) *Attorney, Agent, or Firm*—Morgan & Finnegan LLP

(57) ABSTRACT

In a guiding device for mechanical members, which consists of two parts intended to engage by sliding friction, one of the two parts, called the smooth part, has a smooth, functional, i.e. friction, surface and the other part, called the pierced part, has at least one functional, i.e. friction, surface, including emergent cavities intended to accommodate a grease of the lubricating-paste type and especially an EP grease (extreme-pressure grease) comprising a soap-type constituent, an oil-type constituent and an extreme-pressure additive. The contact angle θ between the functional surface of the smooth part and the grease is in the range from 20 degrees to 40 degrees and the material of the pierced part is such that the contact angle between the functional surface of the pierced part and the grease is in the range from 45 degrees to 75 degrees. The device may be of the slideway/runner type, shaft/bearing type, ball/socket joint type, etc.

34 Claims, 3 Drawing Sheets

GREASE-LUBRICATED SLIDING GUIDING MEMBERS HAVING A LOW COEFFICIENT OF FRICTION AND AN IMPROVED LIFETIME

BACKGROUND OF THE INVENTION

1. Field of the invention

The present invention relates to greased mechanical components. More specifically, the invention relates to greased mechanical components which provide, by sliding friction, a translational or rotational guiding function, in continuous or reciprocating motion, and are designed to meet effectively the concerns of many industrial sectors with regard to simplifying lubrication and reducing the frequency of maintenance.

2. Description of the prior art

Grease-lubricated devices exist in which, by virtue of suitable sealing means, it is possible to make two mechanical parts rub against each other, even when they are subjected to very high loading stresses, with a very low coefficient of friction: examples of such devices are given in the article "Theory and industrial practice of friction" by J J. CAUBET, published by Dunod Technip, 1964, Chapter 13.

FR 910,999 of Oct. 2, 1962, and its patent of Addition FR 921,708 of Jan. 17, 1963, describe an embodiment of such a device in the case of self-aligning bearings for high loads.

Such devices, the technical effectiveness of which is recognized, do have, however, a major drawback associated with the complexity of their practical construction, which leads to high implementation costs incompatible with the current requirements of most of the industrial sectors in question.

One object of the present invention is therefore to provide a guiding device for mechanical members which makes it possible to dispense with the use of a sealing system.

Another object of the invention is to propose a device of the above kind which is effective and inexpensive in the field in question.

Further objects and advantages of the invention will appear on reading the description below.

SUMMARY OF THE INVENTION

The invention proposes a device for guiding mechanical members which consists of two parts intended to interact by sliding friction, one of the two parts, called the smooth part, having a smooth, functional, i.e. friction, surface and the other part, called the pierced part, having at least one functional, i.e. friction, surface, including emergent cavities intended to accommodate a grease of the lubricating-paste type and especially an EP grease (extreme-pressure grease) comprising a soap-type constituent, an oil-type constituent and an extreme-pressure additive, wherein the contact angle between said functional surface of said smooth part and said grease, measured at a temperature called the measurement temperature, which is 15°±5° C. below the temperature at which the onset of separation between said soap-type constituent and said oil-type constituent occurs and/or the onset of evaporation of said oil-type constituent occurs, is in the range from 20 degrees to 40 degrees and the material of said pierced part is such that the contact angle, measured at said measurement temperature, between said functional surface of the pierced part and said grease is in the range from 45 degrees to 75 degrees.

The term "EP grease", denoting an extreme-pressure grease, is well known to those skilled in the art. The expression "extreme-pressure grease" should be understood to mean a grease capable of withstanding a high load without damage. Examples of such greases are lithium greases of the SNR-LUB EP Class NLGI 2 type, or those of the KLUBER CENTOPLEX GLP 402 NLGI 2 type, or lithium greases and solid lubricants of the KLUBER COSTRAC GL 1501 MG NLGI 2 type.

It should be noted that both the smooth part and the pierced part may each have a non-functional surface, but this is not obligatory.

The two parts—the smooth part and the pierced part—are intended to interact by sliding friction, translationally or rotationally, in continuous or reciprocating motion.

The shape of each of the two parts may be plane, cylindrical or spherical.

Although it is commonly employed by those skilled in the art, the concept of the contact angle of a drop of a liquid or viscous product placed on a solid surface is not the subject of standardization, nor even of a completely standardized method of measurement, most particularly when said product is a grease.

The experimental conditions under which the contact angle is measured are therefore given below.

Measurement of the contact angle according to the invention:

Firstly, the surface of the solid body on which it is desired to perform the measurement is cleaned and then a straight bead of grease is deposited thereon. Next, the part is heated until the temperature of its face in contact with the bead of grease reaches a value of 20±5° C. greater than the limit use temperature of the grease. It is maintained at this temperature for the time needed for the grease to become sufficiently liquid to start to spread out over the surface (approximately 90 seconds). Heating of the part is then stopped and it is left to cool. This has the effect of freezing the shape of the drop and allows measurement of its contact angle at room temperature.

Suitable materials for forming the smooth part according to the invention are chosen from steels, for example case-hardened, quench-hardened and ground steels, ground HF quench-hardened steels, steels that are hardened and then coated with hard chromium, nitrided steels and carbonitrided steels, chromium and nickel, as well as from among ceramic-coated steels.

It is necessary each time to measure the contact angle between the grease and the material that is to form the smooth part, which angle must be in the range from 20 degrees to 40 degrees, in order to determine whether this material is really appropriate according to the invention.

The material of which the pierced part is made may be a bulk material. This will usually be chosen from among polymer materials and copolymer materials. However, other materials could be suitable as long as their contact angle with the grease satisfies the specified conditions.

Suitable materials for making the pierced part according to the invention are chosen from polyimides, filled polyimides, for example graphite-filled polyimides, epoxy resins, filled epoxy resins, such as epoxy resins filled with molybdenum disulphide $MoS_2$, polyacetal resins, polyethylene, substituted or unsubstituted fluorocarbons, and especially PFA (perfluoroalkoxy), polyethylene terephthalate, polyethersulphone, polyamides and polyetheretherketone.

It is also necessary each time to measure the contact angle between the grease and the material that is to form the pierced part, which angle must be in the range from 45 degrees to 75 degrees, in order to determine whether this material is really appropriate according to the invention.

The material of which the pierced part is made may also be a substrate covered with a coating. The coating is usually deposited as a thin film, generally having a thickness of approximately 5 µm to approximately 50 µm.

In this case, the substrate is any material, in bulk form or in the form of a thin rolled sheet, for example plain carbon steel, alloy steel, stainless steel, aluminum alloy, copper alloy, titanium alloy, etc.

The thin rolled sheet is advantageously produced in accordance with patent FR-B-2,693,520.

When the material of which the pierced part is made is a substrate covered with a coating, it is advantageously a steel which is prenitrided and then covered with a polymer.

The material of which the coating is made is then chosen from polymer materials and copolymer materials, especially from polyimides, filled polyimides, for example graphite-filled polyimides, epoxy resins, filled epoxy resins, such as epoxy resins filled with molybdenum disulphide $MoS_2$, polyacetal resins, polyethylene, substituted or unsubstituted fluorocarbons, and especially PFA (perfluoroalkoxy), fluoroethylene or fluoropropylene, polyethylene terephthalate, polyethersulphone, polyamides and polyetheretherketone.

When the material of which the pierced part is made is a substrate covered with a coating, it is advantageously a steel that has been subjected beforehand to a surface hardening treatment. This surface hardening treatment may be a thermochemical treatment causing a heteroelement, for example nitrogen, to diffuse into the steel. Said thermochemical treatment is preferably a nitriding treatment in a molten bath of alkali metal cyanates and carbonates and furthermore advantageously containing an amount of at least one sulphur species, for example according to FR-B-2,708,623.

In one particularly advantageous embodiment of the invention, the pierced part is made in the form of a thin rolled sheet, in accordance with the aforementioned FR-B-2,693,520, made of nitrided steel according to the aforementioned FR-B-2,708,623 and coated with a polymer.

In this case too, it will be necessary to check that the contact angle of the material of the coating of the pierced part with the grease is in the range from 45 degrees to 75 degrees in order to determine whether this coating is really appropriate according to the invention.

According to a preferred embodiment of the invention, the cavities, forming "support pads", are distributed over practically the entire surface of the pierced part.

It is then advantageous for at least three cavities to contribute to supporting a load applied to the two parts.

It is then also advantageous for the area occupied by the cavities on the development of the functional surface of the pierced part to represent approximately 20% to approximately 40% of the total area of said development.

The cavities may be substantially the same as each other.

The cavities may be distributed substantially regularly over the entire surface of the pierced part.

If the cavities are not substantially the same as each other and/or distributed substantially irregularly over the entire surface of the pierced part, the shortest distance between the edges of two juxtaposed cavities is advantageously greater than approximately 2 mm.

The emergent surface of each cavity usually has an area of in the range from approximately 3 $mm^2$ to approximately 40 $mm^2$, advantageously in the range from approximately 10 $mm^2$ to approximately 30 $mm^2$.

In an advantageous embodiment of the invention, the cavities emerging on the functional surface of the pierced part do not communicate with each other on the side containing said functional surface of said pierced part.

The cavities may communicate on a non-functional surface of the pierced part. If the cavities communicate on a non-functional surface of the pierced part, for example via a system of channels, a cover advantageously covers the cavities.

In the context of the present invention, when cavities are referred to as communicating with each other, this should be understood to mean that said cavities are "connected via channels (ducts) intentionally created on the surface by the removal of material".

The cavities may be cylindrical, for example.

The smooth part and the pierced part may be plane, cylindrical or spherical.

The present invention provides a shaft/bearing device in which the smooth part is the shaft and the pierced part is the bearing, a slideway/runner device in which the smooth part is the slideway and the pierced part is the runner, or a ball/socket device in which the smooth part is the ball and the pierced part is the socket.

Apart from the guiding devices composed of two rubbing parts, the present invention includes an arrangement in which there are three rubbing parts, not two. For example, in the case of a pierced part in the form of a bushing, the two surfaces (the internal bore and the external cylinder) of the pierced bushing are then functional.

In this configuration, the pierced bushing is "floating", its speed of rotation being only a fraction of that of the shaft, depending on the coefficients of friction.

The advantage of such an arrangement is relatively limited in the case of an oscillating system of the articulation type since the sliding speeds involved are then relatively low, of the order of 0.2 m/s. On the other hand, it becomes much more important for guiding systems in continuous rotation, especially those in which the sliding speeds reach high speeds of approximately 8 m/s to 10 m/s, or even higher. A bushing according to the invention may then advantageously replace a guiding member of more complex design, for example a needle roller bearing, at lower cost.

The description will be more clearly understood with reference to the appended drawings.

DETAILED DESCRIPTION OF THE PREFERRED EMBODIMENTS

Figure 1:
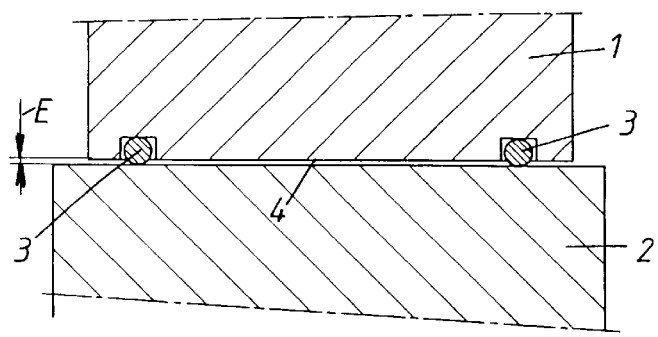
FIG. 1 illustrates schematically the basic principle of the prior art according to FR 910,999 and its patent of Addition FR 921,708.

FIG. 1 shows a runner 1, in this case made of steel, intended to rub on a track 2, also made of steel, against which it bears with a resultant force F. A circular groove is formed in the lower face of the runner 1, into which an O-ring 3 has been fitted, the space E left inside the O-ring being filled with grease 4. The resulting runner 1 is "floating", being supported by a "pad" of grease, making it possible to obtain very low coefficients of friction, typically less than 0.01, even under a high load and when moving slowly.

A simplified arrangement of the runner 1 shown in FIG. 1 in which the O-ring 3 is omitted would not be suitable. This is because, under the effect of the load pressing the runner 1 against the track 2, the grease would in fact be very rapidly expelled from the contact region; the rubbing of the runner 1 on the track 2 would then take place by metal on metal contact and seizing would inevitably occur in a very short space of time. On the other hand, this does not occur when the seal 3 is in place, as then the grease 4 cannot escape since the bushing is sealed.

Figure 2:
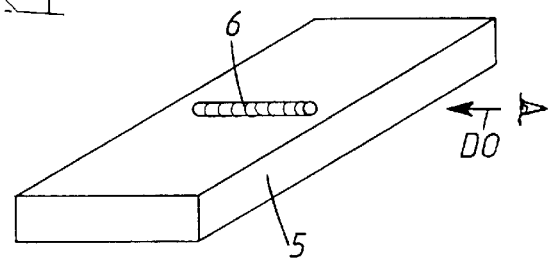
FIGS. 2 to 5 illustrate schematically the measurement of the contact angle according to the invention.

In order to measure the contact angle θ according to the invention, the surface 5 of the solid body on which it is desired to make the measurement is first thoroughly cleaned. Next, a straight bead of grease 6 approximately 2 mm in diameter is deposited, using a syringe, on that surface of the solid body on which it is desired to make the measurement (FIG. 2).

Figure 3:
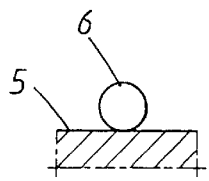
Figure 4:
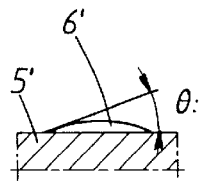
Figure 5:
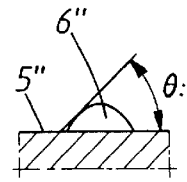

The part is then placed on a hot plate (not shown) until the temperature of its face in contact with the bead of grease reaches a value of 20±5° C. greater than the limit use temperature of the grease. It is maintained at this temperature for approximately 90 seconds. The part is then removed from the hot plate and left to cool, which has the effect of freezing the shape of the drop and thus allowing its contact angle to be measured at room temperature by means of a conventional device of the binocular-magnifier type fitted with a protractor. The direction of observation is indicated by "DO". The results obtained are shown schematically in FIG. 3 (lateral cross-sectional view of the initial bead of grease 6 before heating), and in FIGS. 4 and 5, which each show a lateral cross-sectional view of the bead of grease after heating and then cooling, respectively in the case of a smooth part 5' and a pierced part 5". According to the invention, it is necessary to have θ=20–40° (6') in the case of a smooth part and θ=45–75° (6") in the case of a pierced part.

Figure 6:
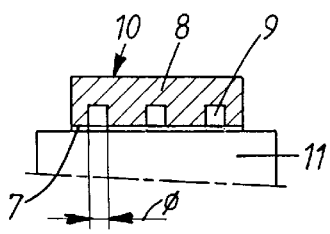
FIG. 6 is a schematic sectional view of a guiding member of the slideway/runner type according to the invention.

In FIG. 6, showing a runner 8/slideway 11 device, cavities 9 are made in the lower face 7 of the runner 8, i.e. its functional face which interacts with the slideway 11 in sliding friction.

Figure 7:
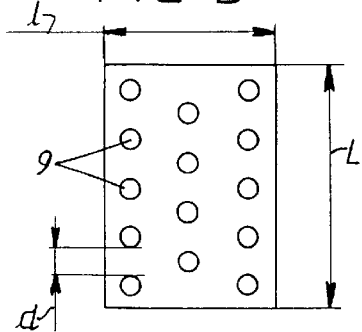
FIG. 7 is a bottom view of the runner shown in FIG. 6.

FIG. 7 shows the runner from below, i.e. its functional surface 7. The cavities in the runner are cylindrical and arranged regularly. They do not communicate with each other on the face 7.

The development of the rubbing surface here is the lower face 7 of the runner 8, the area of which is equal to the product L×l, L and l being respectively the length and width of the runner.

The area occupied by the cavities is equal to $n\pi\phi^2/4$ (n being the number of cavities) and d denotes the shortest distance separating the facing edges of two juxtaposed cavities.

In the preferred embodiments of the invention, it is necessary to have:

$n\pi\phi^2/4$=20 to 40% (L×l)

d>approximately 2 mm approximately 3 mm² <$n\pi\phi^2/4$< approximately 40 mm².

In the arrangement shown in FIGS. 6 and 7, the cavities do not emerge on the non-functional side 10 of the runner.

Figure 8:
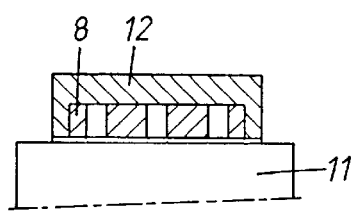
FIG. 8 shows schematically a variant of the slideway/runner type guiding member shown in FIG. 6.

However, it is conceivable for this to be otherwise, i.e. for the holes no longer to be blind. It is then important to prevent the grease which fills the cavities from escaping via the non-functional rear surface 10 of the runner, by suitable means such as a cover 12 covering the cavities (FIG. 8).

In the embodiment shown in FIG. 7, the cavities do not communicate with each other on the face 10. Nevertheless, it is conceivable for them to be able to do so, for example via a system of channels.

In the appended figures, the cavities have been shown in the form of cylindrical holes which are the same as each other and arranged in a regular manner. However, this is not a necessary condition and they may be arranged differently without departing from the scope of the invention.

Figure 9:
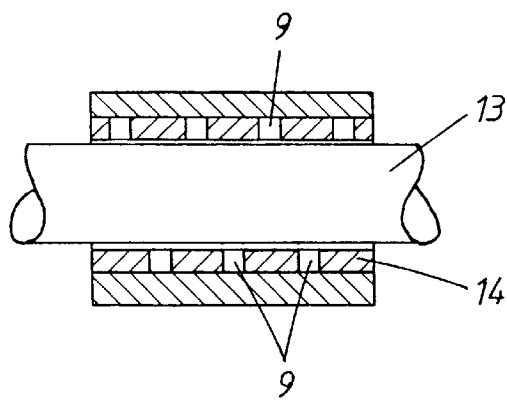
FIG. 9 shows schematically a guiding member according to the invention in the shaft/bearing configuration.
Figure 10:
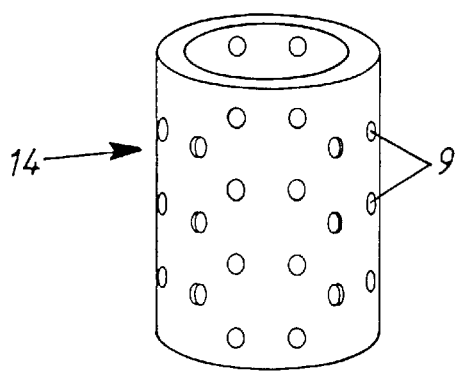
FIG. 10 shows schematically the bearing bush in FIG. 9.

FIG. 9 shows a guiding member according to the invention in the shaft 13/bearing or bearing bush 14 configuration. The cavities are made in the bearing bush 14 (FIG. 10). In this case, the developed surface of the bearing bush 14 is that obtained by slitting the bushing in a direction parallel to its axis and then unrolling it until a rectangular sheet is obtained. All previous remarks with regard to the runner/slideway type device may then be transposed to the shaft/bearing system.

Figure 11:
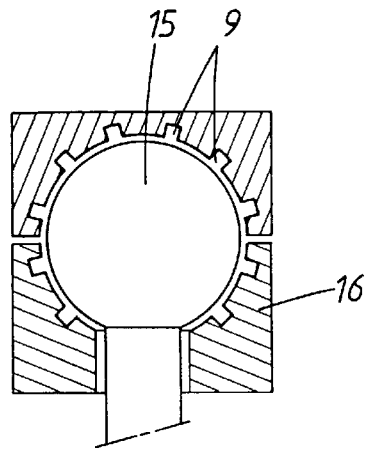
FIG. 11 shows schematically a device of the ball-joint type according to the invention.

FIG. 11 shows a device of the ball 15/socket 16 type according to the invention, the cavities 9 being formed in the sockets, i.e. the concave sliding parts.

Figure 12:
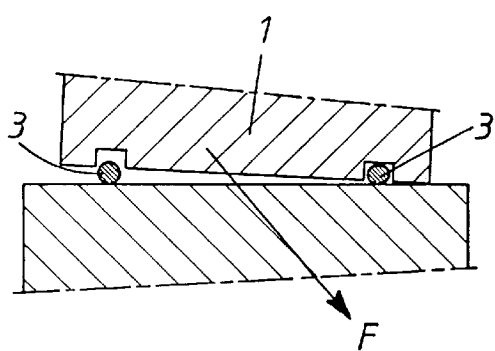
FIG. 12 shows schematically a device of the runner/track type in which there is tilting of the runner.
Figure 13:
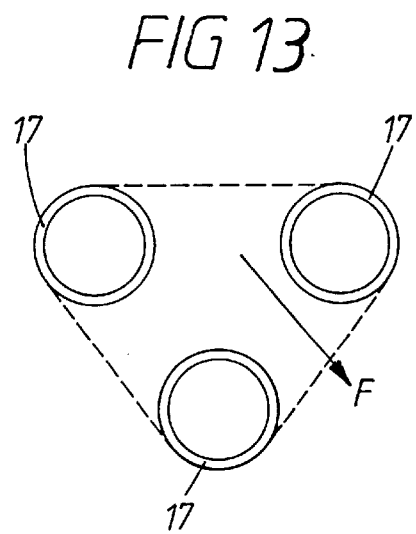
FIG. 13 shows schematically how the runner is supported by three pads.

FIG. 12 repeats the runner and track of FIG. 1, but in a configuration in which the load F of the runner does not give a resultant passing through the centre of the O-ring 3. In this case, the runner 1 tilts, leading to undesirable bearing of surfaces on sharp edges, which generates stresses resulting in premature deterioration of the surfaces in sliding contact. To avoid this, the runner 1 may be supported by at least three "pads" 17, the resultant of the load pressing the runner onto the track then falling inside the resulting support polygon (FIG. 13).

Figure 14:
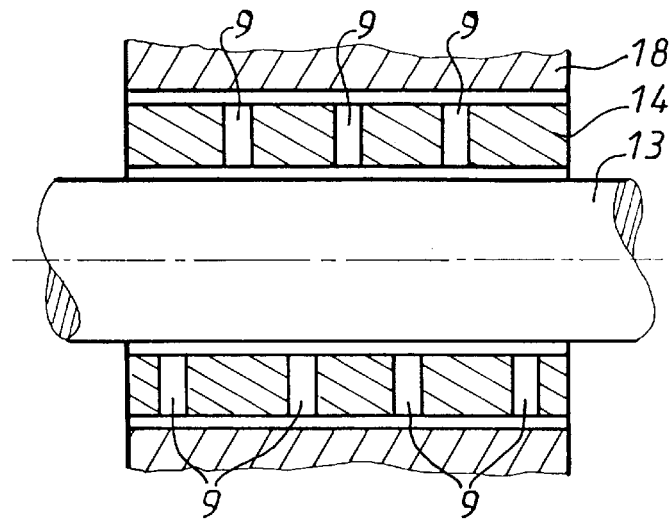
FIG. 14 shows schematically a shaft/bearing configuration in which there are three rubbing parts with two functional surfaces.

FIG. 14 shows a guiding member according to the invention in a shaft/bearing configuration which is distinguished from that in FIG. 9 by the fact that there are three rubbing parts: the shaft 13, the bearing (bushing 14) pierced with holes 9 and the casing 18.

In this embodiment, there are two functional surfaces on the pierced bushing 14, one consisting of its internal bore and the other its external cylinder.

In this configuration, the pierced bushing is "floating".

Figure 15:
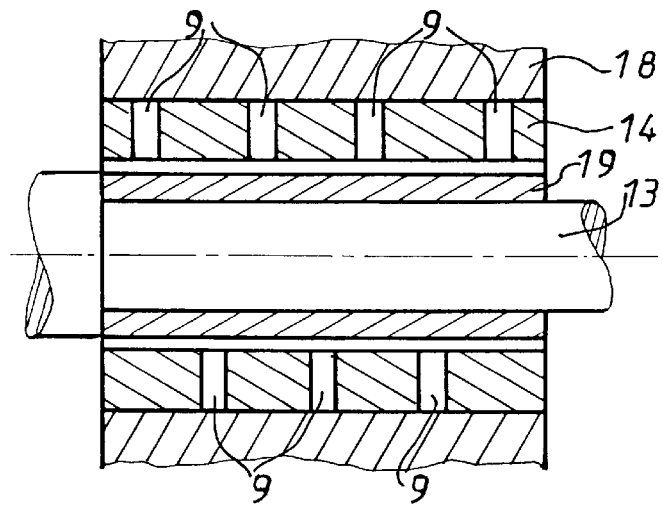
FIG. 15 shows schematically a shaft/bearing configuration in continuous rotation with two rubbing parts, in which a facing is shrunk-fitted onto the shaft level with the functional surface of the pierced bearing (ring).

FIG. 15 shows an embodiment with two rubbing parts, which are the shaft 13 and the bearing (bushing 14) pierced with holes 9. A bearing sleeve 19 made of bearing steel of the 100C6 type has been shrunk-fit onto it. The bushing 14 is an interference fit in a bore of the casing 18.

Figure 16:
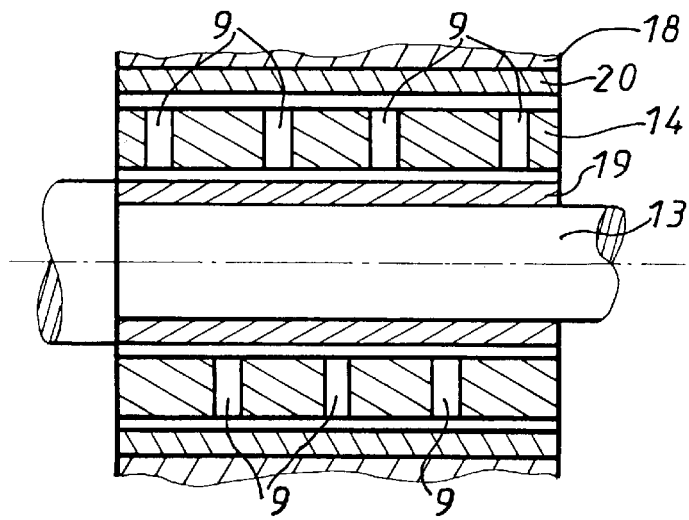
FIG. 16 shows schematically an arrangement with three rubbing parts and two functional surfaces, which is a variant of that shown in FIG. 15, with two bearing sleeves, one shrunk-fitted onto the shaft and the other fitted into the bore of a casing.

FIG. 16 is a variant of FIG. 15 with a "floating" pierced bearing (bushing) which rubs on two bearing sleeves 19 and 20 made of bearing steel of the 100C6 type, respectively shrunk-fit onto the shaft and into the bore of the casing.

The present invention will now be described in greater detail with reference to the following examples.

EXAMPLE 1

Comparative

This example illustrates tests on oscillating bearings.

The configuration is shaft/bearing (bearing bush).

Nature of the shaft: quenched case-hardened 16NC6 steel.

Nature of the bearing (bearing bush): 40% graphite-filled PI 5508 polyimide.

Diameter of the shaft: 30 mm.

Width of the bearing bush: l=20 mm.

Developed length of the bearing bush: π×30=94.25 mm.

Movement: alternating rotation over 90° of arc at a frequency of 1 Hz.

Calculated pressure on the projected surface: 10 MPa.

Sliding speed: 0.2 m/s.

Extreme-pressure grease: lithium soap, SNR-LUB EP type, NLGI 2 grade, for use at temperatures from −30 to +110° C.

The bearings were lubricated during assembly and then operated without additional supply of grease.

In order to determine the shaft/grease and bearing/grease contact angles θ, an average of five measurements was made as indicated above, with beads of grease deposited on parallelepipedal specimens, heated to 130° C. for 90 seconds and then cooled.

The results were as follows:

in the case of the shaft (quenched case-hardened 16NC6 steel): θ=30°;

in the case of the bearing (40% graphite-filled polyimide): θ=60°.

This example used a smooth bearing bush, i.e. one outside the field of the invention.

Results of the tests:

average coefficient of friction: 0.11;

number of oscillations before a rapid rise in the coefficient of friction: 35,000.

EXAMPLE 2

According to the Invention

Example 1 was repeated, except that the bearing bush was pierced with 40 holes (cavities), each 4 mm in diameter, arranged in a regular manner with d (shortest distance separating the facing edges of two juxtaposed cavities)=4 mm.

Results of the tests:

average coefficient of friction: 0.009;

number of oscillations before a rapid increase in the coefficient of friction: >250,000 (test stopped prematurely).

EXAMPLE 3

Comparative

Example 1 was reproduced, except that, in the case of the material of which the bearing bush is made, the polyimide was replaced with a UE 12 P type bronze, an alloy commonly used for bearings.

The bearing bush was smooth, i.e. outside the invention.

The bearing bush/grease contact angle θ, measured under the conditions of Example 1, was 35°.

Results of the tests:

average coefficient of friction: 0.12;

number of oscillations before a rapid increase in the coefficient of friction: 25,000.

EXAMPLE 4

Comparative

Example 2 was repeated, except that, in the case of the material of which the pierced bearing bush is made, a UE 12 P bronze, an alloy commonly used for bearings, was used instead of the polyimide.

The bearing bush/grease contact angle θ, measured under the conditions of Example 1, was 35°, i.e. outside the range of the invention for the pierced part.

Results of the tests:

average coefficient of friction: 0.09;

number of oscillations before a rapid increase in the coefficient of friction: 80,000.

Comments on Examples 1 to 4

1) When the bearing bushes are smooth, i.e. outside the invention, their lifetime is of the same order of magnitude, whether they are made of polyimide or of bronze. The coefficients of friction are themselves comparable and correspond to a hybrid mode, provided that the lubricant remains in the contact region. When the grease, which can escape via the edges of the bearing, is completed eliminated, the coefficient of friction rapidly increases; the bearing then heats up, which causes deterioration, with the polyimide or the bronze of the bearing bush bonding onto the steel shaft.

2) The lifetimes of the pierced bearing bushes made of polyimide (according to the present invention) and made of bronze (outside the invention) are significantly longer than those of the smooth bearing bushes. On dismantling, at the end of the tests, it was observed that all of the grease available in the cavities had been consumed. This reveals the beneficial aspect of the "reserves of lubricant" that the cavities constitute.

3) The coefficient of friction of the pierced bronze bearing bush is less than that of the smooth bronze bearing bush. This may be at least partly due to a more regular supply of grease to the contact region and to a more uniform distribution of this grease in this contact region, thereby reducing the risk of metal/metal contact between the bronze of the bearing and the steel of the shaft.

4) On the other hand, paragraph 3) does not explain the very low coefficient of friction recorded with the pierced polyimide bearing bush (according to the invention). In fact, a value of 0.009 typically corresponds to a hydrodynamic mode of lubrication, which is unexpected in a relatively highly loaded oscillating bearing in which the sliding speed is low.

The lifetime of the pierced polyimide bearing (more than 250,000 oscillations) is also surprising when it is compared with that of the bronze bearing bush (80,000 oscillations).

Broadly speaking, it is just as if the fact of the bearing bush being made of polyimide and of it being pierced resulted in an improvement in the bearing capacity effect and in an increase in the length of time necessary to exhaust the reserve of lubricant.

The theoretical modelling of these phenomena has not been carried out and only explanatory hypotheses can be advanced. These will more conveniently be illustrated with reference to FIG. 1. The grease 4 contained in the available space E between the runner 1, the track 2 and the O-ring 3 transmits laterally only a fraction of the normal pressure that it experiences, this fraction being smaller the more viscous said grease (this stems from the fact that grease obeys the laws of rheology, unlike oils which obey Pascal's law and the hydrostatic law).

A relatively high load can therefore be tolerated, representing an improvement in the bearing capacity effect, and a relatively large amount of play, representing an increase in the reserve of lubricant, before the onset of extrusion of the seal 3 and the appearance of lubricant leakage.

In the configuration of the invention, there is no seal 3. This has an advantageous consequence, associated with the fact that the sliding of the runner on the track does not require the friction of the seal on the track to be overcome, thereby contributing to the creation of a low coefficient of friction.

There may also be another, this time disadvantageous, consequence, whereby the grease, which is no longer contained, naturally tends to escape via the edges of the runner. This may occur more easily and rapidly the better the lubricant wets the surfaces, i.e. the smaller the contact angle between the grease and the materials of which said surfaces are made.

The foregoing may be directly transposed from a runner/slideway device to a device of the shaft/bearing type, as explained in the above examples: with a polyimide bearing bush (contact angle with the grease=60°), the lubricant is contained better than with a bronze bearing bush (contact angle with the grease=35°).

5) It is conceivable that another phenomenon could explain the markedly superior behavior of the oscillating bearing with a steel shaft and a polyimide bearing bush compared with that of the oscillating bearing with a steel shaft and a bronze bearing bush.

Although, as was seen above, the grease is better contained in the contact region with a polyimide bearing bush than with a bronze bearing bush, nonetheless the fact remains that lubricant is consumed in both cases.

In the presence of two metal surfaces to be wetted, it is energetically more favorable for the lubricant to come into contact with the one which has the smaller wetting angle with the grease, in this case the steel shaft rather than the polyimide bearing bush.

The hypothesis may therefore be advanced that each time the surface of the steel shaft goes past a cavity of the polyimide bearing bush it attracts a little of the grease contained in said cavity. The rotation of the shaft therefore constantly replenishes the lubricant on its surface, which in turn helps to stabilize the lubrication regime and therefore improves the bearing capacity effect and the lifetime of the bearing.

In the case of the bronze bearing bush (contact angle of the same order as that of the steel), this phenomenon does not occur.

EXAMPLE 5

Comparative

Example 1 was repeated, except that, in the case of the material of which the bearing bush is made, the polyimide was replaced with XC 38 annealed carbon steel coated on its functional surface with 10 μm of an organic varnish based on an $MoS_2$-filled epoxy resin.

The bearing bush was smooth, i.e. outside the invention.

The XC 38 steel+varnish/grease contact angle θ, measured under the conditions of Example 1, was 70°.

Results of the tests:

average coefficient of friction: 0.09;

number of oscillations before a rapid increase in the coefficient of friction: 45,000 (intense wear at the end of the test).

EXAMPLE 6

According to the Invention

Example 5 was repeated, except that the bearing bush was pierced by 40 holes (cavities), each 4 mm in diameter, arranged in a regular manner with d (shortest distance separating the facing edges of two juxtaposed cavities)=4 mm.

Results of the tests:

average coefficient of friction: 0.0075;

number of oscillations before a rapid increase in the coefficient of friction: >250,000 (test stopped prematurely).

EXAMPLE 7

Comparative

Example 5 was repeated, except that the bearing bush was made of XC 38 uncoated annealed carbon steel.

The bearing bush was smooth, i.e. outside the invention.

The XC 38 steel/grease contact angle θ, measured under the conditions of Example 1, was 25°.

Results of the tests:

average coefficient of friction: unstable;

number of oscillations before a rapid increase in the coefficient of friction: a few dozen before seizing occurred.

EXAMPLE 8

Comparative

Example 6 was repeated, except that the pierced bearing bush was made of XC 38 uncoated annealed carbon steel.

The XC 38 steel/grease contact angle θ, measured under the conditions of Example 1, was 25°, i.e. outside the range of the invention for the pierced part.

Results of the tests:

average coefficient of friction: 0.15;

number of oscillations before a rapid increase in the coefficient of friction: a few hundred before seizing occurred.

Comments on Examples 5 to 8

The same comments as on Examples 1 to 4 may be made, except that the tests result in more marked degradation, in the form of intense wear, or even seizing, as a result of steel/steel contact when the reserve of grease has been consumed and/or when the varnish coating has been worn away.

EXAMPLES 9 TO 14

Example 6 was repeated, with pierced bearing bushes made of varnish-coated steel, varying the number of holes (with a constant diameter) in order to vary the area occupied by the cavities. This area was measured on the development of the rubbing surface and expressed as a percentage of the total area of said development.

The area occupied by the cavities as a percentage of the total area was denoted "S".

The number of oscillations was denoted "N".

The results are given in Table I.

TABLE I

| S% | 5 | 10 | 20 to 40 | 50 | 60 |
|---|---|---|---|---|---|
| N | 35,000 | 80,000 | >250,000 | 20,000 | a few hundred |

Comment

When the area occupied by the cavity was less than 20% of the total area of the development of the bearing, the lifetime of the latter rapidly decreases, reaching that of the bearing fitted with a smooth bearing bush.

Above 40%, the decrease was even more rapid and, on dismantling the bearing at the end of the tests, it was observed that the surface of the bearing bush was highly degraded, with many scratches and descaling of the varnish.

EXAMPLES 15 TO 17

According to the Invention

Example 2 was repeated, i.e. with a pierced polyimide bearing bush, but varying the nature of the material of which the shaft is made.

The grease/shaft contact angle was denoted θ.

The coefficient of friction was denoted $C_F$.

The number of oscillations was denoted "N".

The results are given in Table II.

TABLE II

| Example | 15 | 16 | 17 |
|---|---|---|---|
| Nature of the shaft | Hard chromium | Quenched case-hardened 16 NC 6 steel | Nitro-carbo-sulphided 42 CD 4 steel |
| θ | 35° | 30° | 25° |
| $C_F$ | 0.01 | 0.01 | 0.01 |
| N | 150,000 | >250,000 | 100,000 |

The coefficients of friction were comparable but the lifetimes, represented by the number of oscillations, varied significantly, while still remaining good.

EXAMPLE 18

Comparative

Example 6 was repeated, but varying the nature of the polymer coating.

The steel of the bearing bush was coated on its functional surface with 10 μm of PTFE (polytetrafluoroethylene).

The grease/bearing bush contact angle θ was 85°, i.e. outside the invention.

The coefficient of friction was of the order of 0.008.

The number of oscillations was 90,000.

EXAMPLES 19 and 20

These examples relate to a bearing configuration in continuous rotation (guiding of a shaft rotating in the bore of a casing).

Examples 19 and 20 illustrate, with reference to FIGS. 15 and 16, the cases of two rubbing parts (a single functional surface) and three rubbing parts (two functional surfaces), respectively.

The experimental conditions were as follows:
material of the smooth part: 100C6 bearing steel;
material of the pierced part: nitrided XC 38 carbon steel coated with 12 μm of a perfluoroalkoxy organic varnish;
nature of the grease: same as that in Example 1;
diameter of the shaft: 30 mm;
width of the bearing bush: 25 mm;
calculated pressure on the projected area: 5 bars.

The tests were conducted at various shaft rotation speeds.

In all cases, the motion could continue for hundreds of hours without any operating anomaly and with a very low resisting torque, corresponding to an extremely low coefficient of friction, in the order of 0.005 to 0.0005, typical of a very good hydrodynamic lubrication regime.

The distinction between the set-up with two rubbing parts and that with three rubbing parts appears at the two extremes of the range of variation of the rotation speed.

Below 2,000 to 3,000 rpm, the system with two rubbing parts (Example 19) gives better reproducibility of the results (100% success), as opposed to that with three rubbing parts (Example 20: 90% success).

Above 10,000 to 12,000 rpm, the reverse is the case.

Those skilled in the art will understand that although the invention has been described and illustrated by particular embodiments, numerous variants are conceivable within the scope of the invention as defined in the appended claims.

What is claimed is:

1. A device for guiding mechanical members, which consists of two parts intended to interact by sliding friction, one of the two parts, called the smooth part, having a smooth, functional, i.e. friction, surface and the other part, called the pierced part, having at least one functional, i.e. friction, surface, including emergent cavities intended to accommodate a grease of the lubricating-paste type comprising a soap-type constituent, an oil-type constituent and an extreme-pressure additive, wherein the contact angle θ between said functional surface of said smooth part and said grease, measured at a temperature called the measurement temperature, which is 15°+5° C. below the temperature at which the onset of separation between said soap-type constituent and said oil-type constituent occurs, is in the range from 20 degrees to 40 degrees and the material of said pierced part is such that the contact angle, measured at said measurement temperature, between said functional surface of the pierced part and said grease is in the range from 45 degrees to 75 degrees.

2. The device claimed in claim 1 wherein the material of which said smooth part is made is chosen from steel, chromium and nickel.

3. The device claimed in claim 2 wherein said steel is chosen from case-hardened, quench-hardened and ground steel, ground HF quench-hardened steel, steel hardened and then coated with hard chromium, nitrided steel, ceramic-coated steel and carbonitrided steel.

4. The device claimed in claim 1 wherein the material of which said pierced part is made is a bulk material.

5. The device claimed in claim 1 wherein the material of which said pierced part is made is chosen from polymer materials and copolymer materials.

6. The device claimed in claim 5 wherein the material of which said pierced part is made is chosen from polyimides, filled polyimides, epoxy resins, filled epoxy resins, polyacetal resins, polyethylene, substituted or unsubstituted fluorocarbons, polyethylene terephthalate, polyethersulphone, polyamides and polyetheretherketone.

7. The device claimed in claim 6 wherein said fluorocarbon is PFA (perfluoroalkoxy).

8. The device claimed in claim 1 wherein the material of which said pierced part is made is chosen from bulk substrates, thin rolled sheets and substrates covered with a coating.

9. The device claimed in claim 8 wherein the material of which said coating is made is a material chosen from polymer materials and copolymer materials.

10. The device claimed in claim 9 wherein said material of which said coating is made is chosen from polyimides, filled polyimides, epoxy resins, filled epoxy resins, polyacetal resins, polyethylene, substituted or unsubstituted fluorocarbons, polyethyelene terephthalate, polyethersulphone, polyamides and polyetheretherketone.

11. The device claimed in claim 10 wherein said fluorocarbon is PFA (perfluoroalkoxy).

12. The device claimed in claim 9 wherein said material of which said pierced part is made is prenitrided steel.

13. The device claimed in claim 12 wherein said steel has been subjected beforehand to a surface hardening treatment causing nitrogen to diffuse into it.

14. The device claimed in claim 13 wherein said hardening treatment is a thermochemical nitriding treatment in a molten bath of alkali metal cyanates and carbonates.

15. The device claimed in claim 14 wherein said molten bath also contains at least one sulphur species.

16. The device claimed in claim 1 wherein said cavities are distributed over practically the entire surface of said pierced part.

17. The device claimed in claim 16 wherein at least three cavities contribute to supporting a load applied to said two parts.

18. The device claimed in claim 16 wherein the area occupied by said cavities on the development of said functional surface of said pierced part represents approximately 20 to approximately 40% of the total area of said development.

19. The device claimed in claim 1 wherein said cavities are substantially identical.

20. The device claimed in claim 1 wherein said cavities are distributed substantially regularly over the entire surface of said pierced part.

21. The device claimed in claim 1 wherein said cavities are not substantially identical.

22. The device claimed in claim 21 wherein the shortest distance between the edges of two juxtaposed cavities is greater than approximately 2 mm and the emergent surface of each cavity has an area in the range from approximately 10 mm$^2$ to approximately 30 mm$^2$.

23. The device claimed in claim 21 wherein the shortest distance between the edges of two juxtaposed cavities is greater than approximately 2 mm.

24. The device claimed in claim 1 wherein said cavities are distributed substantially irregularly over the entire surface of said pierced part.

25. The device claimed in claim 1 wherein the emergent surface of each cavity has an area in the range from approximately 3 mm$^2$ to approximately 40 mm$^2$.

26. The device claimed in claim 1 wherein said cavities emerging on the functional surface of said pierced part do not communicate with each other on said functional surface of said pierced part.

27. The device claimed in claim 1 wherein said cavities emerging on the functional surface of said pierced part do not communicate with each other on a non-functional surface of said pierced part.

28. The device claimed in claim 27 wherein a cover covers said cavities.

29. The device claimed in claim 1 wherein said cavities emerging on the functional surface of said pierced part communicate with each other on a non-functional surface of said pierced part via a system of channels.

30. The device claimed in claim 1 wherein said cavities are cylindrical.

31. A shaft/bearing device comprising a device as claimed in claim 1 wherein said smooth part is a shaft and said pierced part is a bearing.

32. The device claimed in claim 31 wherein said bearing has two functional surfaces.

33. A ball/socket device comprising a device as claimed in claim 1 wherein said smooth part is a ball and said pierced part is a socket.

34. A slideway/runner device comprising a device as claimed in claim 1 wherein said smooth part is a slideway and said pieced part is a runner.

* * * * *